(12) United States Patent
Tallone et al.

(10) Patent No.: US 7,474,826 B2
(45) Date of Patent: Jan. 6, 2009

(54) MOUNTING ARRANGEMENT FOR OPTICAL COMPONENTS

(75) Inventors: Luigi Tallone, Paesana (IT); Giuseppe Achille Azzini, Cremona (IT)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/810,297

(22) Filed: Mar. 26, 2004

(65) Prior Publication Data

US 2004/0223692 A1   Nov. 11, 2004

(30) Foreign Application Priority Data

Apr. 1, 2003    (EP) .................................. 0307492

(51) Int. Cl.
  *G02B 6/30* (2006.01)
  *G02B 6/36* (2006.01)
(52) U.S. Cl. .......................................... 385/49; 385/88
(58) Field of Classification Search ................. 385/33, 385/49, 129–132, 88; 257/79
  See application file for complete search history.

(56) References Cited

U.S. PATENT DOCUMENTS

| | | | | |
|---|---|---|---|---|
| 5,481,629 A | * | 1/1996 | Tabuchi | 385/14 |
| 5,611,006 A | * | 3/1997 | Tabuchi | 385/14 |
| 5,787,214 A | * | 7/1998 | Harpin et al. | 385/49 |
| 5,854,867 A | * | 12/1998 | Lee et al. | 385/49 |
| 5,930,429 A | * | 7/1999 | Trott | 385/93 |
| 5,956,441 A | * | 9/1999 | Fairchild et al. | 385/27 |
| 5,978,531 A | | 11/1999 | Funabashi | 385/45 |
| 5,999,303 A | * | 12/1999 | Drake | 359/224 |
| 6,081,635 A | * | 6/2000 | Hehmann | 385/24 |
| 6,118,915 A | * | 9/2000 | Sato | 385/39 |
| 6,275,317 B1 | * | 8/2001 | Doerr et al. | 398/201 |
| 6,374,021 B1 | * | 4/2002 | Nakanishi et al. | 385/49 |
| 6,445,857 B1 | | 9/2002 | Korenaga et al. | 385/52 |
| 2001/0033716 A1 | | 10/2001 | Fukutomi | 385/49 |
| 2002/0031307 A1 | | 3/2002 | Kimura | 385/49 |
| 2002/0096686 A1 | | 7/2002 | Raj et al. | 257/79 |

FOREIGN PATENT DOCUMENTS

| | | |
|---|---|---|
| EP | 0 778 478 | 6/1997 |
| EP | 1 202 084 | 5/2002 |
| JP | 61282803 | 12/1985 |
| JP | 10282350 | 4/1997 |
| JP | 11167043 | 6/1997 |
| JP | 10307221 | 11/1998 |
| JP | 10332992 | 12/1998 |
| JP | 200347050 | 6/1999 |

* cited by examiner

*Primary Examiner*—Frank G Font
*Assistant Examiner*—Erin D Chiem

(57) ABSTRACT

A mounting arrangement for an optical component in a planar lightwave circuit (PLC) is provided. The mounting arrangement includes a substrate, an input optical fiber associated with the substrate, an output optical waveguide manufactured on the substrate, and an optical component mounted on the substrate to transmit optical radiation from the input optical fiber to the output optical waveguide. The mounting arrangement also includes a length of optical waveguide on the substrate, in the same planar layers of the output optical waveguide, interposed on the substrate so that the at least one optical component is interposed between the length of optical waveguide and the output optical waveguide. In another embodiment, the mounting arrangement includes a length of optical fiber associated to the substrate so that the at least one optical component is interposed between the input optical fiber and the length of optical fiber.

9 Claims, 3 Drawing Sheets

MOUNTING ARRANGEMENT FOR OPTICAL COMPONENTS

FIELD OF THE INVENTION

The present invention relates to mounting arrangements for optical components.

DISCUSSION OF THE BACKGROUND ART

As used herein, the wording "optical component" is intended to encompass purely optical components such as e.g. optical isolators, filters and attenuators for integrated optics components as well as electro-optical components.

Additionally, wording such as "optical", "light", and the like is used herein with the meaning currently allotted to those terms in fiber and integrated optics, being thus intended to apply to radiation including, in additional to visible light, e.g. also infrared and ultraviolet radiation.

More specifically, the invention relates to integrating optical components in planar lightwave circuits (PLCS). Exemplary of a PLC is a so-called silicon optical bench or SiOB.

PLCs are a promising solution to implement different optical functions and modules such as multiplexing (MUX), demultiplexing (DEMUX), switches, amplifiers. The main advantage of the PLC approach is related to the cost reduction in comparison to standard planar technology and the possibility of achieving fully automated production.

Using PLC technology for complex functions—such as optical amplifiers—requires discrete components such as isolators to be integrated in a hybrid fashion in a PLC while complying with severe constraints, especially in terms of acceptable insertion losses.

Mechanical tolerances typical of current manufacturing processes are not directly compatible with these requirements, thus making it necessary to perform a final active alignment process. Active alignment is time consuming and, as such, practically outbalances the advantages of the PLC approach.

The need therefore exists for mounting arrangements for components, such as optical isolators, that may be adapted to compensate geometrical errors due to process tolerances while allowing a fully passive assembly process.

SUMMARY OF THE INVENTION

The object of the present invention is to provide an arrangement that fulfils such need.

According to the present invention, such an object is achieved by means of a mounting arrangement having the features set forth in the claims that follow.

The arrangement of the invention is particularly adapted for use in connection with optical isolators. It can however be advantageously applied also to other devices to be integrated in a PLC such as thin film filters, plates and so on.

Essentially, the invention provides for the integration of at least one optical component such as an optical isolator in a planar lightwave circuit using only passive alignment. The arrangement of the invention is in fact quite robust with respect to geometrical inaccuracies due to the mechanical tolerances such as e.g. mechanical tolerances at a PLC input fiber.

An embodiment of the invention provides for the input signal to the PLC being injected via an input monomode optical fiber into an integrated optical waveguide. An alternative embodiment provides for the output signal from the PLC being extracted through an integrated optical waveguide that is preceded by a length of a monomode optical fiber.

The arrangement disclosed herein is thus a mounting arrangement for at least one optical component in a planar lightwave circuit. The arrangement includes a substrate, an input optical fiber associated with the substrate, and an output optical waveguide manufactured in a given set of planar layers of the substrate. The optical component (which in fact may be an assembly comprised of two or more individual elements) is mounted on the substrate to transmit optical radiation from the input optical fiber to the output optical waveguide. The arrangement comprises a length of optical waveguide manufactured on the substrate in the same planar layers of the output optical waveguide, the length of optical waveguide being interposed between the input optical fiber and the optical component. The optical component is thus interposed between the length of optical waveguide and the output optical waveguide. Alternatively, a length of optical fiber is associated to the substrate between the optical component and the output optical waveguide, whereby the optical component is interposed between the input optical fiber and the length of optical fiber.

The errors related e.g. to the mutual positioning of the various components and/or the positioning of those components with respect to the PLC waveguides are compensated by the symmetrical layout implemented in a proper focusing configuration with an internal intermediate image. In that case, strict tolerances must be met only in the good matching of an optical system comprised of e.g. ball lenses, such strict tolerances being easily attainable.

BRIEF DESCRIPTION OF THE DRAWINGS

The invention will now be described, by way of example only, by referring to the enclosed figures of drawing, wherein FIG. 1 exemplifies a first embodiment of the arrangement described herein.

DETAILED DESCRIPTION OF THE PREFERRED EMBODIMENT

Figure 1:
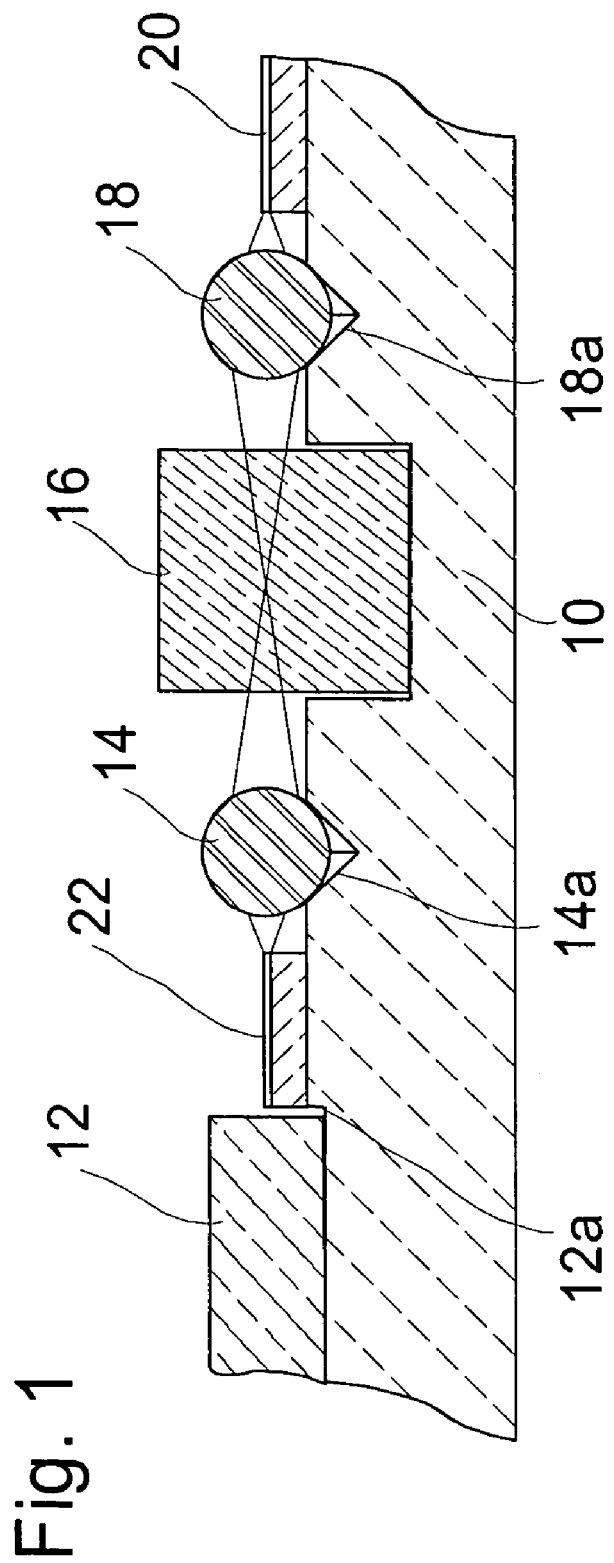
Figure 2:
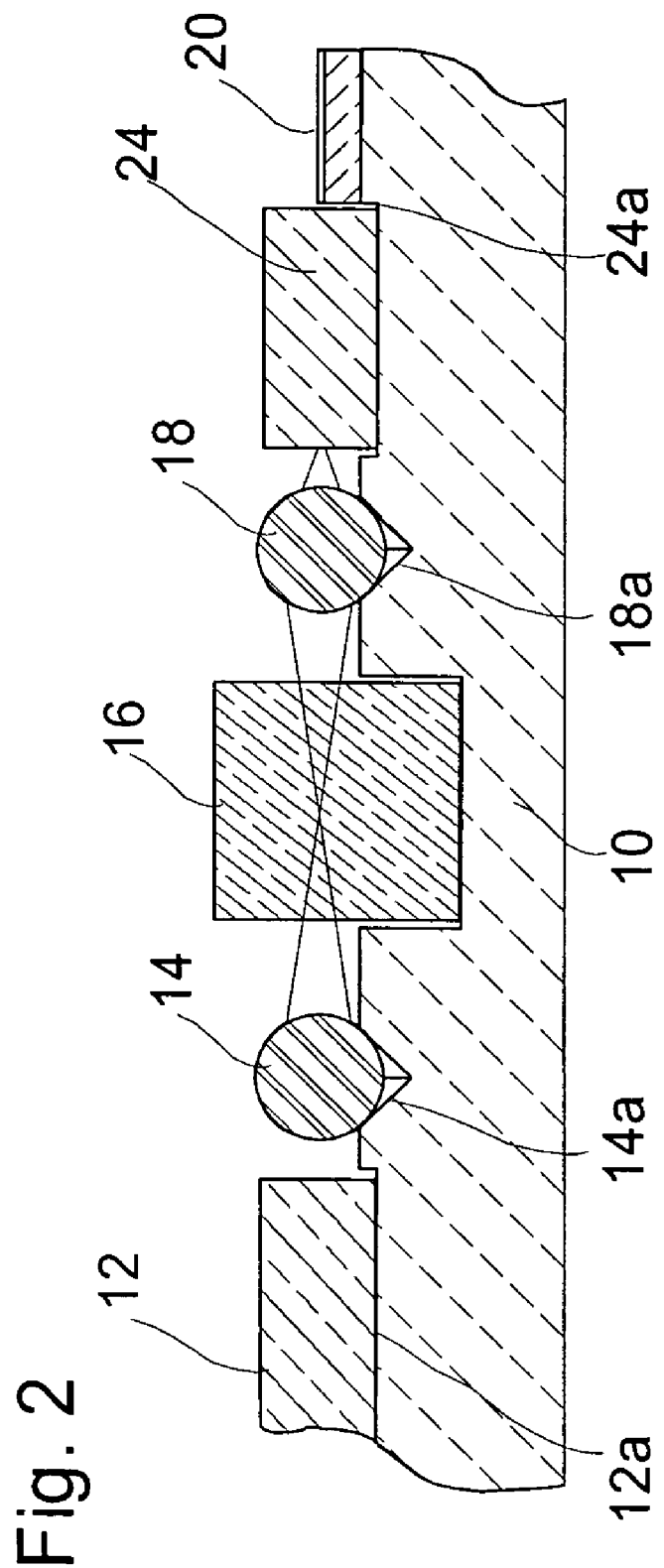
FIG. 2 shows a possible variant of the embodiment shown in FIG. 1.

In both arrangements shown in FIGS. 1 and 2, the various elements shown are mounted in a generally hybrid fashion over a substrate or support 10 typically comprised of a so-called silicon optical bench or SiOB.

In both arrangements shown, an optical signal from a monomode input optical fiber 12 is collimated by an optical system comprised e.g. of a ball lens 14 and caused to pass through an optical isolator such as an optical isolator crystal or filter 16. The optical radiation exiting the filter 16 traverses another optical system—again preferably comprised of a ball lens 18—to be injected into an output optical waveguide 20.

Both theoretical analysis and practical experimentation show that an arrangement comprising—only—the elements just described, namely the monomode input fiber 12, two lenses such as the ball lenses 14 and 18 having interposed therebetween an optical isolator such as isolator 16, and an output waveguide such as waveguide 20, is in fact quite sensitive to inaccuracies both in terms of manufacturing errors (e.g. in producing a V-groove 12a for receiving the input fiber 12, or two pyramidal recesses 14a and 18a for locating the ball lenses 14 and 18) and as regards the accuracy of mounting the components onto the substrate 10.

In practical terms, tolerances relating to these factors may cause the overall input-to-output coupling efficiency to drop from an ideal value in the vicinity of 90% to much lower values such as 30% or less.

By investigating in greater detail the features of such a system (reference is still being made at this point to a "basic" system including only the optical fiber 12, the ball lenses 14 and 18 having the optical isolator 16 located therebetween and the waveguide 20) a number of interesting points can be observed.

In a symmetrical optical system having an internal image such as the system comprised of the lenses 14 and 18 with the optical isolator 16 located therebetween, the positions of the object and the output image (as defined in the standard vocabulary of optics) are invariant—i.e. insensitive—with respect to small rigid lateral shifts of the two lenses if the displacement is the same for the two lenses. Also, the errors usually affecting the creation of pyramidal holes such as the holes 14a and 18a adapted to receive the lenses 14 and 18 on the same substrate are essentially the same if those two holes are produced by means of the same process. The same also applies to the case of V-grooves being provided (e.g. machined) at the upper surface of support 10.

Additionally, isolators optimised for converging optical beams are commercially available, the same also applying to ball lenses having very narrow tolerances insofar as the diameter is concerned. These narrow tolerances may be obtained directly during the production process without any selection or sorting being required.

Based on that analysis, it was found that an optical system as considered in the foregoing can be rendered highly insensitive to the geometrical tolerances considered in the foregoing provided some minor changes are introduced in the overall arrangement.

For instance, in the arrangement shown in FIG. 1, a further waveguide 22 is interposed between the optical fiber 12 and the first ball lens 14.

Conversely, in the arrangement of FIG. 2, a length of a further monomode optical fiber 24 is interposed between the second ball lens 18 and the output waveguide 20.

In both instances, the fiber 12 (and the fiber 24 as well, in the case of the embodiment of FIG. 2) can be locked in a corresponding V-groove 12a, 24a provided in the support 10.

The ball lenses 14 and 18 are arranged in the respective seats comprised of the pyramidal recesses or holes 14a, 18a.

The filter/isolator 16 is usually located in a corresponding recess provided at the upper surface of the support 10.

The waveguides 20, 22 are produced directly on the substrate 10 by resorting to standard planar optics techniques.

In the embodiment of FIG. 1, the optical fiber 12, locked in the respective V-groove 12a, is coupled with the short segment of waveguide 22. This is manufactured in the same planar layers of the collecting waveguide 20.

In that way, an almost absolute alignment of the two waveguides 22 and 20 is achieved as a result of the manufacturing process.

Any possible displacement in the assembly comprised of the lenses 14, 18 and the optical isolator 16 can thus be essentially regarded as due to a sort of "floating" effect that does in no way affect the two waveguides 22 and 20.

The arrangement shown is adapted to operate both on polarized and non-polarized input radiation. In the case of non-polarized input radiation, the isolator crystal 16 must be optimised for focused beams.

Figure 3:
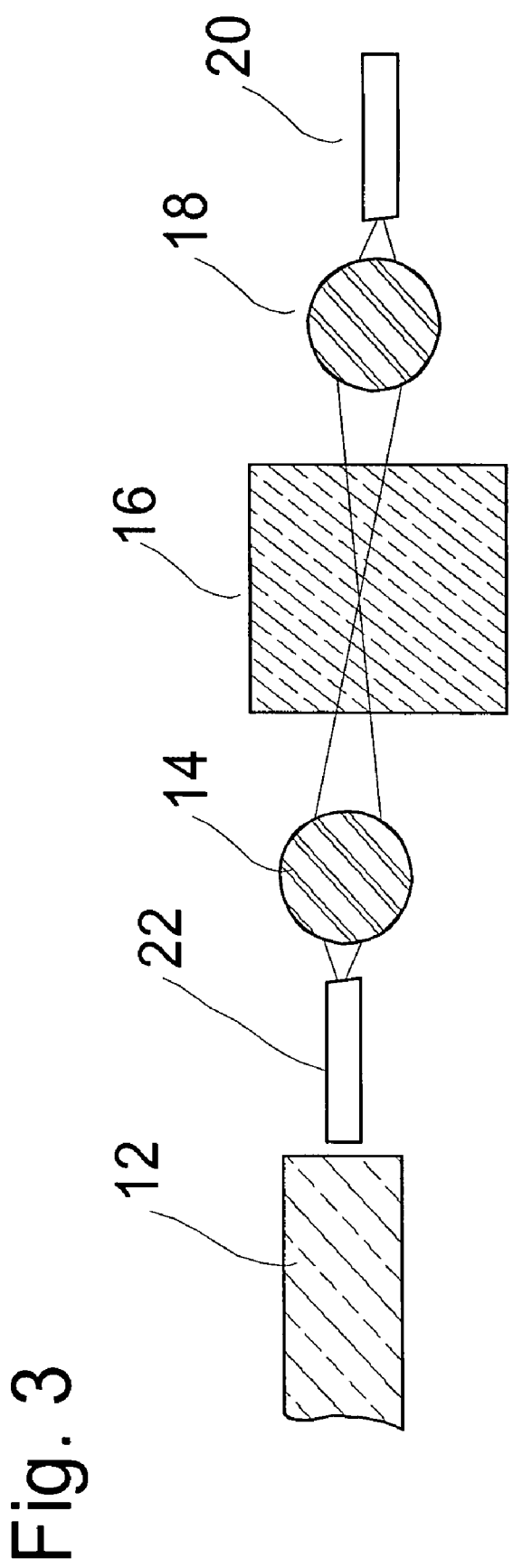
FIG. 3 shows an advantageous implementing detail of the arrangement described herein.

FIG. 3 essentially corresponds to a top plan view of the arrangement of FIG. 1 where the support 10 was not reproduced in order to better appreciate the relative positioning of the various elements shown.

FIG. 3 shows that—in a preferred embodiment of the invention—in order to prevent back reflections the end faces of the waveguides 22 and 20 facing "inwardly" of the arrangement (i.e. facing towards the optical assembly comprised of the lenses 14, 18 and the isolator 16) are preferably at least slightly offset with respect to the perpendicular to the main propagation axis of radiation through the arrangement shown.

Specifically "tilt" angles may be selected for those end faces in the range of e.g. about 7 degrees with respect to a nominal perpendicular cut to the main propagation axis. This leads to the actual propagation path of radiation between the optical assembly comprised of the lenses 14 and 18 and the isolator 16 to be at an angle (of e.g. 3 degrees, in the case of the exemplary values for the tilt angles previously referred to) with respect to the nominal input-to-output propagation path through the whole arrangement.

The foregoing applies to the plan view of FIG. 3, while the propagation path of radiation between the lenses 14 and 18, as seen in the elevational view of FIG. 1 is in fact thoroughly aligned with the input-to-output propagation path from the fiber 12 to the waveguide 20 (and with the upper surface of the support 10 as well).

In the alternative arrangement shown in FIG. 2, the assembly comprised of the lenses 14, 18 and the optical isolator 16 is arranged between the optical fiber 12 and the length of the fiber 24 locked in its respective V-groove 24a and directly coupled with the output waveguide 20.

The fiber segment 24 is preferably obtained from the same input fiber batch. This leads to a very strict similarity (essentially diameter tolerance) with respect to the fiber 12. The fiber end surfaces are preferably provided with anti-reflective (AR) coatings. The two V-grooves 12a and 24a should preferably have the same geometry.

In both arrangements shown, the ball lenses 14 and 18 are positioned in the respective pyramidal holes 14a, 18a.

The systems shown in the figures exhibit a much lower sensitivity to small misalignments in comparison with traditional systems.

Experiments and calculations performed by the applicant demonstrate the degradation of input-to-output optical efficiency with respect to the ideal value in the vicinity of 90% to be limited—at most—to roughly one dB, leading to percent values of the resulting optical efficiency in the range of a 79%. These results of course relate to the typical tolerances intrinsic to PLC processes.

For the purpose of discussion herein, the assembly comprised of the lenses 14, 18 with the isolator 16 arranged therebetween will be essentially regarded as an optical component even though such an assembly is in fact comprised of various elements of course, without prejudice to the underlying principles of the invention, the embodiments and details may vary, also significantly, with respect to what has been previously described and shown, by way of example only, without departing from the scope of the invention, as defined by the claims that follow. Specifically, it will be appreciated that any feature previously disclosed in connection with a given embodiment can be freely adapted to any other embodiment of the invention.

The invention claimed is:

1. A mounting arrangement for at least one optical component in a planar lightwave circuit, the arrangement comprising:

a substrate, an input optical fiber mounted on said substrate, an output optical waveguide in a given set of planar layers of said substrate, said one optical component is mounted on said substrate to transmit optical radiation from said input optical fiber to said output optical waveguide, and a further optical waveguide is disposed on said substrate in the same planar layers of said output optical waveguide wherein said output optical waveguide and said further optical waveguide are aligned along an input-to-output propagation path, thereby providing substantial alignment of said output optical waveguide and said further optical waveguide, said further optical waveguide is interposed between said input optical fiber and said optical component and wherein said optical component is interposed between said further optical waveguide and said output optical waveguide, and wherein respective end surfaces of said output optical waveguide and said further optical waveguide are offset with respect to a perpendicular to said input-to-output propagation path, and a propagation path of radiation through said at least one optical component is at an angle with respect to said input-to-output propagation path.

2. The arrangement of claim 1, wherein said substrate is a silicon optical bench (SiOB) support.

3. The arrangement of claim 1, wherein said respective end surfaces comprise a tilt angle.

4. The arrangement of claim 1, wherein said at least one optical component comprises an optical isolator.

5. The arrangement of claim 4, wherein said optical isolator is optimised for focused beams.

6. The arrangement of claim 1, wherein said at least one optical component comprises an optical filter.

7. The arrangement of claim 1, wherein said at least one optical component comprises at least one spherical or ball lens.

8. The arrangement of claim 7, wherein said substrate comprises at least pyramidal hole for receiving said at least one spherical or ball lens.

9. The arrangement of claim 1, wherein said at least one optical component comprises a symmetrical optical system having an internal image.

* * * * *